United States Patent [19]

Berejka

[11] 4,264,490

[45] Apr. 28, 1981

[54] COMPOSITION OF A POLYETHYLENE AND ISOBUTYLENE COPOLYMER

[75] Inventor: Anthony J. Berejka, Huntington, N.Y.

[73] Assignee: Radiation Dynamics, Inc., Melville, N.Y.

[21] Appl. No.: 38,062

[22] Filed: May 11, 1979

[51] Int. Cl.$^2$ .......................... C08K 5/10; C08K 5/13; C08K 23/06

[52] U.S. Cl. ............................. 260/45.85 B; 53/442; 204/159.2; 264/22; 264/299.3; 428/57; 525/232; 525/240

[58] Field of Search ............................. 525/232, 240; 204/159.2; 260/45.85 B

[56] References Cited

U.S. PATENT DOCUMENTS

| | | | |
|---|---|---|---|
| 3,262,997 | 7/1966 | Edwards et al. | 525/232 |
| 3,775,387 | 11/1973 | Baldwin | 525/361 |
| 3,816,371 | 6/1974 | Baldwin | 525/237 |
| 3,819,574 | 6/1974 | Brown et al. | 260/45.85 B |

*Primary Examiner*—J. Ziegler
*Attorney, Agent, or Firm*—Howard L. Rose

[57] ABSTRACT

Cross-linkable polyethylene blended with a copolymer of isobutylene and a conjugated diene is capable of being cross-linked, bonded, stretched and recovered without a significant loss of strength characteristics or seal.

24 Claims, No Drawings

COMPOSITION OF A POLYETHYLENE AND ISOBUTYLENE COPOLYMER

This invention relates to compositions of polyethylene. More particularly, this invention relates to a cross-linkable polyethylene blended with certain butylene copolymers.

The usefulness of materials made of a cross-linkable polyethylene has been known for many years. For example, it is known that films or sheets of polyethylene may be cross-linked by exposure to relatively high dosages of ionizing radiation (e.g., 15 megarads or more) or by use of certain chemical techniques. The resulting material may then be heated to above its crystalline softening point, stretched, and cooled while stretched to form a partially crystallized structure which retains its stretched dimensions. Upon reheating to above the crystalline softening point, the material contracts to substantially its original dimensions. This latter process is called "recovery", and polyethylene is known to have a sufficient hot modulus (e.g., about 10 to 50 psi) to be heat recoverable. Cross-linked polyethylene has valuable uses other than in heat recoverable articles. For example, cross-linked polyethylene can be used in barrier films and membranes, in jacketing for wire and cable, in tubing and hoses, and in molded or formed articles.

Unfortunately, cross-linked polyethylene is very difficult to bond (e.g., heat or ultrasonically seal) to itself. Neither does its satisfactorily retain a bond upon reheating above its crystalline softening point even if an adequate bond is initially obtained. For example, a film of cross-linked polyethylene can usually only be heat-sealed to form a seam or bond with itself by first physically abrading its surface and/or by chemically treating the surface prior to heat sealing. This is expensive, and even then the seals are usually of marginal quality. It is also difficult to accomplish this type of seal in the field or in non-factory situations. To render this film "recoverable" it is first irradiated or chemically reacted to cross-link it, then heated above its crystalline softening point and stretched, and then cooled while stretched to form the recoverable, partially crystalline structure. Recovery is then affected by reheating above the crystalline softening point. During heating to a point above the crystalline softening point at either time, the seal is usually lost or rendered unacceptable.

Because of this lack of bondability, the various important properties of cross-linked polyethylene and its rather good recovery features cannot be fully exploited in many important areas. Examples of such areas limited by this lack of bondability are food wrapping, medical implement packaging, electrical insulation, weather proofing, corrosion protection wraps, water barrier membranes, heat recoverable articles and the like.

Historically, various butyl polymers have been blended with polyethylene to impart crease resistance (e.g., make more supple) and heat sealability to the resulting product. A typical example of a known butyl polymer is butyl rubber, a copolymer of the monomers isoprene and isobutylene and isomers thereof. Such a polymer is usually represented by the repetitive structure:

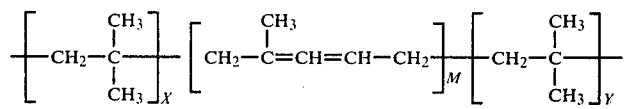

Unfortunately, the same mechanisms employed to cross-link polyethylene (e.g., irradiation or chemically initiated mechanisms) also cause scissoning and degradation of the known butyl polymers used as polyethylene additives. Such butyl polymers are, therefore, not appropriate additives to employ with polyethylene when it is to be cross-linked, since the scissoning that results usually reduces the strength characteristics of the product to unacceptable levels. Indeed, in some instances heat sealed (e.g., by heat and pressure or by ultrasonic technique) articles of such blended compositions may completely fail for lack of strength when heated to above the crystalline softening point such as during stretching or during heat recovery. With compositions which are predominately polyethylene, bond failure may occur when the bond is under stress, e.g., a material is recovered or "shrunk" about an article of a dimension greater than the ultimate recovery dimension of the material.

In short, then, butyl polymer additives as a group, are known to be of little or no help in solving the sealability problem related to cross-linked polyethylene. They have, therefore, been generally discarded as an area of inquiry by those seeking to improve the sealability of cross-linked polyethylene.

The synthesis of a new group of butyl polymers containing conjugated diene functionality has recently been reported. See in this respect:

1. U.S. Pat. No. 3,816,371
2. U.S. Pat. No. 3,775,387
3. Baldwin et al, "Graft Curing With A Modified Butyl Rubber" *Chemistry and Properties of Cross-linked Polymers*, 1977 Academic Press, Inc., pg, 273-287.
4. "Conjugated Diene Butyl" *New Products Technical Information*, June 1976, Exxon Chemical Corp., Elastomers Technology Division, Linden, New Jersey.

The disclosures of these references are incorporated herein by reference.

Of particular interest are those butyl polymers disclosed in these references which generally are a copolymer of isobutylene and a conjugated $C_5$ diene. Specific interest is focused on those polymers called "CDB", short for conjugated diene butyl. CDB is generally represented by the structures:

(A)

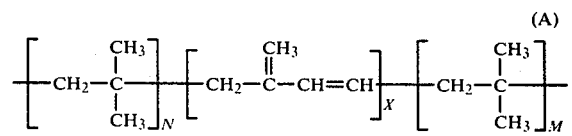

-continued

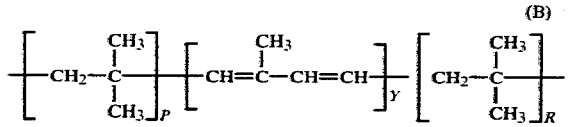 (B)

or mixtures of (A) and (B); wherein N, M, P and R are of a sufficient finite number and total so that the conjugated diene amounts to less than about 5 mole % and usually between about 1–2 mole % of the structure. In short, CDB is a high molecular weight elastomer with an essentially saturated hydrocarbon backbone of isobutylene except for about 1–2 mole % of conjugated $C_5$ diene.

The literature reports these new copolymers to be cross-linkable. However, since cross-linkability usually results in a loss of sealability, it would be anticipated that these new copolymers would not help solve the problem of rendering cross-linkable, recoverable polyethylene which is acceptably heat sealable.

It has now been found, quite unexpectedly, and contrary to what might be anticipated from the teachings of the prior art, that when a copolymer of isobutylene and a conjugated diene is admixed with a cross-linkable polyethylene, there is formed a blend which is capable of being cross-linked, heat sealed or bonded and then even stretched and recovered without substantial loss of strength characteristics or loss of the seal. It has also been found, quite unexpectedly, that such a copolymer has an apparent synergistic effect upon the polyethylene in that the level of irradiation necessary to cross-link the polyethylene to an acceptable level is substantially reduced. Indeed, in certain instances these strength characteristics, surprisingly and synergistically are improved.

Based upon these findings, this invention fulfills several long felt and other needs by providing a unique composition comprised of a cross-linkable polyethylene and a copolymer of isobutylene and a conjugated diene. In most compositions encompassed by this invention the conjugated diene is less than about 5 mole % of said copolymer. In addition, the preferred compositions are capable of being formed into an elastomeric sheet, film or other structure which may be heat sealed, cross-linked, stretched after heating to above its crystalline softening point to build in recovery, cooled and later recovered successfully, without significant loss of the strength of the seal formed.

The term "heat sealed" or the like is used herein according to its known generic meaning. The term thus includes not only those techniques which employ heat and pressure to obtain a bond or seal, but other known techniques as well, such as ultrasonic bonding. With these bonding methods, crystalline or glassy materials are brought above their melt transition and fused together with pressure, thus forming a bonding system.

Any cross-linkable polyethylene may be employed in the practice of this invention. Preferably, the polyethylene employed is of a high density such as about 0.95–0.96. However, low density (0.91) or polyethylene copolymers may also be employed. The particular choice of a specific polyethylene will depend upon the intended end use. If the composition, for example, is to be used for weather proofing or food wrapping, a polyethylene with low vapor permeability characteristics will be chosen. If production or molding parameters are overriding, the polyethylene will be chosen to meet these requirements.

The copolymer of isobutylene and a conjugated diene may be any one which adds heat sealability to the blend and yet which does not scission significantly during irradiation of the polyethylene so as to deteriorate the characteristics of the final product to an undesirable level. Preferably, the conjugated diene is a $C_5$ diene. The copolymers particularly preferred are those known as CDB describe above wherein the saturated hydrocarbon backbone is isobutylene and the conjugated diene structure is represented by:

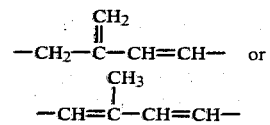

or mixtures thereof. Preferably the conjugated diene amounts to about 1–2 mole % of the structure and most preferably about 1.2–1.5 mole %. A particularly preferred CDB is one produced by Exxon Corporation. This CDB is the product of the synthesis of isobutylene and isoprene subsequently halogenated (Cl) and then dehydrohalogenated. In short, it is the dehydrohalogenation product of chlorobutyl as reported in the above identified literature incorporated herein by reference. This CDB is represented structurally by formulae (A) and (B) above and is usually a mixture thereof.

The percentage of polyethylene and copolymer employed may vary over a wide range depending upon the characteristics sought or needed in the final product. One of the useful purposes to which the compositions of this invention may be put is in the use of heat sealable structures created from tubes, sheets or films of the composition which have "recovery" built into them. Generally speaking polyethylene should be used in an amount sufficient to impart a discernable melt transition to the blend. Similarly speaking, the copolymer is used in a sufficient amount to make the composition (blend) heat sealable when used for this intended purpose.

These criteria are fulfilled in most instances by a composition which includes about 30–70 wt. % polyethylene and about 70–30% copolymer. Particularly preferred for the aforesaid intended purposes is a composition of equal parts polyethylene and copolymer which may or may not include additives. A specific composition, without additives, found itself consists of 50 wt. % polyethylene and 50 wt. % CDB copolymer.

Other ingredients may be added to the blend for their known purposes. Such ingredients include, for example, pigments, fillers, antioxidants, plasticizers, and the like, all of which are conventional and known for their intended purpose. Generally speaking, they are added in amounts conventionally recognized, but adjusted where necessary so as not to degrade or defeat the intended purposes of this invention. Such amounts often do not exceed 50 wt. % of the total blend and usually less than about 10 wt. %. Carbon black is one specific example of a filler. Others include such compounds as titanium dioxide, other known inorganic opacifiers, organic pigments, and inorganic coloring agents. An example of a useful antioxidant is one manufactured by Ciba Geigy and trademarked IRGANOX 1010. This antioxidant is a hindered phenolic having a molecular weight of 1178. It is, by chemical nomenclature, tetra kis[methylene 3-

(3',5',-ditert-butyl-4'-hydroxy phenyl)propionate]methane whose structure is generally recognized as:

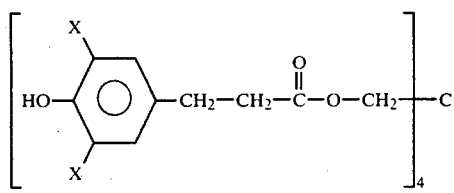

The amount of this antioxidant used, usually does not exceed about 1%. Other antioxidants, stabilizers, or agents used to impart specific end use properties such as flame retardants or blowing agents to produce foam may also be used. These are employed in amounts well known to those skilled in the art.

The compositions of this invention find unique applicability in the art of recoverable cross-linked polyethylene sheeting, wraps, tubing and films, which are heat sealed to form a desired structure. Examples of known uses include food wrapping, medical implement packaging, weather proofing, electrical insulation, corrosion protection wraps, water-proofing membranes, and the like. It has been found that the compositions of this invention are heat sealable even when the polyethylene has been cross-linked and that the seal so formed is maintained even when the structure is heated above the crystalline softening point of the polyethylene such as during heat recovery. In some instances materials based on these compositions exhibit at least substantially the same strength characteristics as the material prior to cross-linking. In certain other instances, the material unexpectedly exhibits significantly better strength characteristics than it did prior to cross-linking. In certain compositions this is true at both below and above the crystalline softening point of the material.

Materials made from these compositions may be formed into their sheet or film structure using conventional techniques. This may include, for example, initially blending the ingredients in solid form using standard blending equipment at elevated temperatures to improve blending. The resultant blend is then usually cooled and granulated, again using vconventional granulating equipment. The granulated particles may then be extruded through a die, of known construction, to form a sheet or film of the desired thickness and width.

The sheet so formed is readily cross-linkable at dosages of irradiation synergistically lower than expected, heat sealable, and recoverable without significant loss of seal strength. This may be effected in several ways. In one technique, for example, the sheet or film is first exposed to a radiation dose sufficient to cross-link the polyethylene, using conventional equipment. For the purposes of this invention, dosages of about 2-5 megarads (MR) have been found sufficient to cross-link the blend despite the fact that if the sheet were 100% polyethylene a dosage of about 15 MR would normally be necessary. Thereafter the sheet may be heated to above its crystalline softening point (e.g., the softening point for high density polyethylene is about 132° C., thus, heating may be done at about 105° C.), stretched to a given extended size and cooled to establish the new size as the size of the sheet. The sheet may then be loosely wrapped around its intended object (e.g., a piece of food) heat sealed at its edges to close off the wrap, thereby to make it tight, and reheated to above its crystalline softening point (e.g., briefly above 150° C.) to allow recovery to the extent that the size of the item being wrapped allows recovery, thereby to form a tight wrap with seal still in tact. It is a property of this invention, of course, that the seal maintains its strength during recovery and thereafter. If necessary a small opening may be left unsealed so that air can escape while the wrap is shrinking. This opening can be subsequently sealed to provide a hermetically tight package.

The above technique is only exemplary as many of the steps may be reversed or repositioned to meet a particular need. For example, irradiation may take place after heat sealing. As another example, heat sealing can take place before stretching or even recovery in certain special situations. In some instances, irradiation exposure after forming a hermetically sealed package may be desirable in order to sterilize the package and its contents.

The specific heating times and temperatures employed are well within the skill of the art and depend upon size, thickness and the like. Generally speaking, with high density polyethylene compounds stretching after heating to equilibrium at about 140°-160° C. may take place and extend the material from about 5% to 700% beyond the original size of the structure without tearing or breaking of the material. Recovery times and temperatures are also well within the skill of the art and depend upon the parameters of the circumstance. Where perishable foods, for example, are being handled, initial wrapping before recovery will be reasonably tight so as to minimize exposure to recovery heat, usually at about 140°-160° C. for high density polyethylene compositions. Notably lower temperatures may be employed when using low density or polyethylene copolymer compositions. It may be possible to recover a portion of the wrap from which the perishable food is shielded thereby enabling looser initial wrapping and/or longer exposure to heat. As another example, there the wrap is to be used to weather proof a non-heat sensitive item, or a sterile instrument package longer heating times, greater stretching percentages and longer recovery times may be desirable to establish the necessary end result. Since the compositions of this invention exhibit excellent hot modulus, a rather wide variety of temperatures, times, and other parameters are available as economy, necessity and end use may dictate.

This invention will now be described with respect to certain examples presented for illustrative purposes:

EXAMPLE 1

The following compositions were blended using a standard Banbury mixer without steam:

TABLE 1

| INGREDIENTS (wt. %) | COMPOSITIONS | | | | | |
|---|---|---|---|---|---|---|
| | No. 1 | No. 2 | No. 3 | No. 4 | No. 5 | No. 6 |
| CDB | 70 | 50 | 30 | 49.5 | — | 49.4 |
| Butyl 268 | — | — | — | — | 50 | — |
| HDPE | 30 | 50 | 70 | 49.5 | 50 | 49.4 |
| Irganox 1010 | — | — | — | 1.0 | — | — |
| Chemlik 30 | — | — | — | — | — | 0.9 |

TABLE 1-continued

| INGRE-DIENTS (wt. %) | COMPOSITIONS | | | | | |
|---|---|---|---|---|---|---|
| | No. 1 | No. 2 | No. 3 | No. 4 | No. 5 | No. 6 |
| Microcel E | — | — | — | — | — | 0.3 |

CDB = the Exxon CDB compound described above wherein the $C_5$ conjugated diene is about 1.2–1.5 mole % of the structure which is a mixture of (A) and (B); the compound being the dehydrohalogenation product of chlorobutyl formed from the chlorination of butyl rubber.
Butyl 268 = butyl rubber (i.e., conventional isoprene/isobutylene copolymer)
HDPE = high density polyethylene (approx. density 0.96)
Irganox 1010 = the hindered phenolic anti-oxidant described above (Ciba-Giegy)
Chemlink 30 = tri-methyol propane trimethacrylate (Ware Chemical)
Microcel E = diatomaceous earth silica filler (Johns Manville)

The blends were then formed into a number of relatively thick (i.e., 75 mils) slabs and relatively thin films (i.e., 5 mils) for further testing, using a conventional platen press and molds to provide the necessary thickness.

Each slab and film was then irradiated using a conventional 3 MeV Dynamitrol Electron Beam Accelerator, at dosages as indicated in TABLE II and IIA. Slabs of Compound No. 5 irradiated at over 10 Mrads exhibited a visible phase separation indicating heavy scissioning of the butyl rubber and incompatibility of the butyl rubber with HDPE when cross-linked. A small amount of incompatibility was noted in the pads of Compound No. 6 at levels of irradiation above 10 Mrads due to the marginal incompatibility of the acrylate additive. The other pads showed full compatibility. No visible differences were noted in any of the film samples.

EXAMPLE 2

Using a number of unirradiated films from Example 1, the following test regime was established. The films were cut into 1-inch wide strips and split into two groups. The first group was irradiated (as in Example 1) and then ultrasonically bonded (sealed) using a ¼ inch bond line. The result was a bond having extended therefrom an upper and lower tab which constituted the two ends of the original strip.

The procedure was reversed for the second group in that bonding took place before irradiation. One set of samples from Group 1 were manually tested to see if the bond (if formed) was acceptable. The results, evaluated subjectively, were as follows:

TABLE II

| | BONDED AFTER IRRADIATION | | | | | |
|---|---|---|---|---|---|---|
| Dose, Mrads | No. 1 | No. 2 | No. 3 | No. 4 | No. 5 | No. 6 |
| None | Good | Good | No Bond | Good | Good | Slight Bond |
| 2.5 | Good | Good | No Bond | Good | Good | Good |
| 5.0 | Good | Good | No Bond | Good | Good | Some Bond |
| 7.0 | No Bond | Good | No Bond | Good | No Bond | Some Bond |
| 10.0 | Bonded[1] | No Bond | No Bond | No Bond | No Bond | No Bond |
| 15.0 | Slight Bond | Slight Bond | No Bond | Slight Bond | No Bond | Slight Bond |
| 20.0 | Bonded[2] | No Bond[1] | No Bond | No Bond | No Bond | No Bond |

[1] Some distortion, holes, etc. at bond line.
[2] Excessive distortion, holes, etc. at bond line.
[3] "No Bond" means the two films either fell apart after being exposed to bonding conditions or that there was practically no resistance to peeling the films apart even if there was a slight attachment.

From this test it may be concluded that for this system, compositions by weight of 70% and 30% for CDB and HDPE represent the upper and lower practical limits on the composition in that 70% HDPE cannot be easily bonded and 30% HDPE is too soft and flexible for easy bonding. It is also seen the polyfunctional acrylate interferes with bonding. Compound No. 5 shows that butyl rubber scissions demonstrably at radiation dosages of 7 Mrads and above and that no reasonable bonding could be achieved with these incompatible, degraded blends. At 10 Mrads or above only marginal film bonds were formed with the better compositions, Nos. 1, 2 and 4.

The remaining bonded samples of the first group and those of the second group (those irradiated and then bonded and those bonded and then irradiated respectively) were then subjected to a bond strength "creep" test. The test consisted of placing the strip in an air circulating oven set at 90° C. with the upper tab secured and with a 4 oz. weight hanging from the lower tab. The time at which bond failure (i.e., disbondment or film separation) occurred was recorded. The results are as follows:

TABLE IIA

| ADHESION CREEP TEST, TIME TO FAILURE (MINUTES) | | | | | | |
|---|---|---|---|---|---|---|
| IRRADIATED THEN BONDED | | | | | | |
| COMPOUND NO. | 1 | 2 | 3 | 4 | 5 | 6 |
| GROUP 1 | | | | | | |
| Dose, Mrads | | | | | | |
| None (Control) | 10 | 180 | 10 | 240 | 1295 | NT |
| 2.5 | 1460 | 210 | NT | 360 | 15 | 270 |
| 5.0 | 35 | 1460 | 75 | 350 | 150 | 120 |
| 7.0 | NT | 115 | NT | 60 | NT | 15 |
| 10.0 | 5 | 5 | NT | NT | NT | NT |
| 15.0 | 0 | 10 | 85 | 115 | 5 | 5 |
| 20.0 | 0 | NT | NT | NT | 5 | NT |
| BONDED THEN IRRADIATED | | | | | | |
| GROUP II* | 1 | 2 | 3 | 4 | 5 | 6 |
| 10 | NT | X | X | S | C | X |
| 20 | C | X | X | X | S | X |

* No disbondment occurred in Group II;
X = no creep;
S = slight creep;
C = creep but not disbondment;
NT = no test sample.

Bonded and irradiated, but untested, samples from Group II were tested using the same procedure except that an 8 oz. weight was employed. The results were as follows:

TABLE IIB

ADHESION CREEP TEST, TIME TO FAILURE (MINUTES) BONDED THEN IRRADIATED

| Compound No. | 1 | 2 | 3 | 4 | 5 | 6 |
|---|---|---|---|---|---|---|
| Dose, Myrads | | | | | | |
| 10 | (1) | >180(2) | >300SC | >435S | 25F | >420X |
| 20 | ~805F | >450(3) | >1470SC | >1470X | <805F | >450SC |

X = No creep;
SC = some creep;
S = slight creep;
F = fail
(1) Sample showed creep to 75% of bond depth after 420 min.
(2) No creep at >180 min.; sample clip let go of film.
(3) Fell from clips.

A comparison of these results indicates that:
1. Durable bonds are formed by first bonding, then irradiating;
2. Compounds 2 and 4 show best bondability (sealability) even when bonded after irradiation.
3. CDB gives unexpected advantages over butyl rubber in that CDB/HDPE blends exhibit greater bond durability. Compound No. 5 (Table IIB) illustrates the adverse effects of irradiation on conventional butyl in blends with polyethylene.
4. Bonds are successfully made with CDB/HDPE films irradiated at unexpectedly low dosages; i.e., about 2–5 Mrads;
5. A preferred blend comprises equal parts of CDB and HDPE, and even more preferred is one consisting essentially of 50% CDB and 50% HDPE (by wt.).

EXAMPLE 3

Using a number of unirradiated and irradiated slabs from Example 1, which has been pressed into pads of 6 inches by 6 inches by 75 mils thick, a series of strength tests were run. The tests run were as follows:
1. Shore A Durometer Hardness test at 23° C. as described in ANSI/ASTM D2240-75.
2. 100% modulus per ASTM D-412-75.
3. 300% modulus per ASTM D-412-75.
4. Tensile strength/elongation test; ANSI/ASTM D412-75 using standard tensile dumbbells and 20 inches per minute as the strain rate. The results were as follows:

TABLE III

PHYSICAL PROPERTIES AT 23° C.

| COMPOUND NO.: | 1 | 2 | 3 | 4 | 5 | 6 |
|---|---|---|---|---|---|---|
| Dose, Mrad | | | | | | |
| NONE | | | | | | |
| Shore A Hardness: | 74 | 94 | 97 | 95 | 95 | 92 |
| 100% Modulus, psi: | 365 | 965 | 1335 | 915 | 905 | 990 |
| 300% Modulus, psi: | 400 | — | — | 940 | 930 | — |
| Tensile Strength, psi: | — | 990 | 1585 | 985 | 1130 | 1175 |
| Elongation, %: | 450% | 300% | 340% | 500% | 700% | 210% |
| 2.5Mrad | | | | | | |
| Shore A Hardness: | 75 | 94 | 96 | 94 | 95 | 93 |
| 100% Modulus, psi: | 485 | 1105 | 1485 | 1010 | 905 | 1230 |
| 300% Modulus, psi: | 680 | 1180 | 1500 | 1050 | 935 | — |
| Tensile Strength, psi: | 980 | 1810 | 2260 | 1860 | 915 | 1360 |
| Elongation, %: | 590% | 630% | 640% | 720% | 250% | 175% |
| 7.5Mrad | | | | | | |
| Shore A Hardness: | 75 | 94 | 97 | 94 | 95 | 93 |
| 100% Modulus, psi: | 500 | 1030 | 1630 | 970 | 900 | 1330 |
| 300% Modulus, psi: | 830 | 1245 | 1675 | 1080 | — | — |
| Tensile Strength, psi: | 955 | 1690 | 2730 | 1760 | 925 | 1485 |
| Elongation, %: | 380% | 500% | 605% | 600% | 230% | 170% |
| 15.0 MRAD | | | | | | |
| Shore A Hardness: | 75 | 94 | 97 | 94 | 95 | 93 |
| 100% Modulus, psi: | 625 | 1135 | 1665 | 1065 | 890 | 1330 |
| 300% Modulus, psi: | — | 1430 | 1770 | 1270 | — | — |
| Tensile Strength, psi: | 835 | 1655 | 2190 | 1565 | 900 | 1480 |
| Elongation, %: | 200% | 375% | 415% | 420% | 165% | 165% |

The physical property data for Compounds Nos. 1, 2, 3 and 4 show the excellent irradiation response of CDB blends with polyethylene. The high tensile strength coupled with lower elongation for Compound No. 6 exemplifies the tighter cure state brought about by incorporating a polyfunctional acrylate in these blends. The relatively low tensile strength and low elongation of Compound No. 5, especially after being exposed to ionizing irradiation, reflects the chain scissioning of conventional butyl rubbers which have been irradiated.

EXAMPLE 4

Tensile test pads such as those used in Example 3 were subjected to electron beam irradiation using a 3 MeV Dynamitron and tested for physical properties at elevated temperatures. The effects of cross-linking are more pronounced in tests performed above the melt transition of the crystalline segment of such plastic blends.

TABLE IV

PHYSICAL PROPERTIES AT ELEVATED TEMPERATURES

| COMPOUND NO. | 1 | 2 | 3 | 4 | 5 | 6 |
|---|---|---|---|---|---|---|
| DOSE | | | | | | |
| None | | | | | | |
| Tested at 140° C. | | | | | | |

TABLE IV-continued

PHYSICAL PROPERTIES AT ELEVATED TEMPERATURES

| COMPOUND NO. | 1 | 2 | 3 | 4 | 5 | 6 |
|---|---|---|---|---|---|---|
| 100% Modulus, psi: | <1 | — | — | — | — | — |
| 300% Modulus, psi: | <2 | — | — | — | — | — |
| Tensile Strength, psi: | <1 | — | ~3 | ~51 | ~20 | ~55 |
| Elongation, %: | 500% | — | 720% | — | —. | 35% |
| 2.5Mrad | | | | | | |
| *Tested at 140° C.* | | | | | | |
| 100% Modulus, psi: | 55 | 225 | 170 | 90 | 9 | — |
| 300% Modulus, psi: | 75 | 250 | 155 | 90 | 7 | — |
| Tensile Strength, psi: | 90 | 230 | 230 | 140 | 8 | 150 |
| Elongation, %: | 310% | 255% | 600% | 550% | >600% | 50% |
| 2.5 Mrad | | | | | | |
| *Tested at 175° C.* | | | | | | |
| 100% Modulus, psi: | 35 | 55 | 35 | — | — | — |
| 300% Modulus, psi: | — | — | — | — | — | — |
| Tensile Strength, psi: | 60 | 80 | 45 | — | — | — |
| Elongation, %: | 170% | 210% | 150% | — | — | — |
| 5Mrad | | | | | | |
| *Tested at 150° C.* | | | | | | |
| 100% Modulus, psi: | — | 90 | 40 | — | — | — |
| 300% Modulus, psi: | — | — | — | — | — | — |
| Tensile Strength, psi: | — | 115 | 80 | — | — | — |
| Elongation, %: | — | 180% | 295% | — | — | — |
| 7.5Mrad | | | | | | |
| *Tested at 140° C.* | | | | | | |
| 100% Modulus, psi: | 95 | 55 | 75 | 60 | 15 | — |
| 300% Modulus, psi: | — | — | 180 | 130 | 25 | — |
| Tensile Strength, psi: | 140 | 140 | 180 | 135 | 40 | 105 |
| Elongation, %: | 195% | 255% | 240% | 310% | >600% | 40% |
| 15Mrad | | | | | | |
| *Tested at 140° C.* | | | | | | |
| 100% Modulus, psi: | — | 140 | 110 | 85 | 30 | — |
| 300% Modulus, psi: | — | — | — | — | 50 | — |
| Tensile Strength, psi: | 80 | 245 | 165 | 140 | 85 | 165 |
| Elongation, %: | 65% | 185% | 175% | 200% | 190% | 40% |

The unirradiated controls could barely be tested since the plastic portion of these blends totally melted. The physical strength which was measured reflects the gum strength of the rubber in these blends. The elevated temperature data of these blends again reflects the excellent irradiation response of CDB blends with polyethylene. Compound No. 6 with the polyfunctional acrylate again exhibits a tighter cure state. A very notable property is the outstanding properties developed after exposure to only 2.5 Mrads. Compounds Nos. 2 and 3 exhibit higher hot modulus and tensile properties than can be attained with simple irradiation of high density polyethylene by itself.

EXAMPLE 5

Pads from Example 1 which were approximately 0.075 inches thick, were cut into strips ½" wide by 3" long. These strips were then irradiated, using the aforesaid equipment at the indicated dosages. Thereafter, a 1" bench mark was made on each strip and the strips were then heated to 150° C. in an air circulating oven. The strips were removed from the oven and stretched (expanded) to the indicated amount (i.e., bench mark expanded to 2 inches=100% expansion; expanded 1¾"=75%). After conditioning at 5 and 13 days at room temperature, the stretched strips were recovered in an oven at 150° C. for 5 to 10 minutes. The percentage recovery was noted. If recovery was back to where the bench mark was again 1 inch, then recovery was listed as 100%; if back to 1-1/16", then 94%; and if back to 15/16", then 106%. The results were as follows:

TABLE V

| DOSE (Mrad) | SAMPLE/TEST | | -1- | -2- | -3- | -4- | -5- | -6- |
|---|---|---|---|---|---|---|---|---|
| 20 | EXPANSION | | 81% | 119% | 100% | 100% | 100% | 88% |
| | RECOVERY | 5 day | 100% | 100% | 100% | 100% | 100% | 100% |
| | EXPANSION | | 94% | 100% | 94% | 113% | 100% | 88% |
| | RECOVERY | 13 day | 100% | 100% | 100% | 100% | 100% | 100% |
| 15 | EXPANSION | | 94% | 88% | 125% | 81% | 138% | 88% |
| | RECOVERY | 5 day | 100% | 100% | 100% | 100% | 100% | 100% |
| | EXPANSION | | 75% | 81% | 88% | 94% | 100% | 100%[1] |
| | RECOVERY | 13 day | 92% | 100% | 100% | 100% | 100% | 100% |
| 10 | EXPANSION | | 94% | 119% | 106% | 94% | 100% | 88% |
| | RECOVERY | 5 day | 100% | 100% | 100% | 100% | 100% | 100% |
| | EXPANSION | | 81% | 88% | 88% | 100% | 100% | 88%[1] |
| | RECOVERY | 13 day | 100% | 100% | 100% | 100% | 100% | 100% |
| 7.5 | EXPANSION | | 88% | 75% | 100% | 88% | 100% | 88% |
| | RECOVERY | 5 day | 100% | 100% | 100% | 100% | 100% | 100% |
| | EXPANSION | | 75% | 94% | 94% | 100% | 100% | 88%[1] |

TABLE V-continued

| DOSE (Mrad) | SAMPLE/TEST | | -1- | -2- | -3- | -4- | -5- | -6- |
|---|---|---|---|---|---|---|---|---|
| | RECOVERY | 13 day | 100% | 100% | 100% | 100% | 100% | 100% |
| 5.0 | EXPANSION | | 94% | 94% | 94% | 94% | 88% | 81% |
| | RECOVERY | 5 day | 100% | 100% | 100% | 100% | 100% | 100% |
| | EXPANSION | | 75% | 100% | 106% | 81% | 81% | 88%(1) |
| | RECOVERY | 13 day | 100% | 106% | 100% | 100% | 100% | 100% |
| 2.5 | EXPANSION | | 88% | 100% | 94% | 94% | 88% | — |
| | RECOVERY | 5 day | 100% | 106% | 100% | 100% | 113% | |
| | EXPANSION | | 82% | 94% | 82% | 94% | 100% | 56%(1) |
| | RECOVERY | 13 day | 100% | 106% | 100% | 100% | 100% | 106% |
| 0.0 | EXPANSION | | 100% | 50%(2) | 100% | 100% | 88% | (4) |
| (Control)(3) | RECOVERY | 5 day | 119% | 100% | 81% | 125% | 25% | |
| | EXPANSION | | 88% | 100% | 100% | 125% | 113% | (4) |
| | RECOVERY | 13 day | 112% | 112% | 112% | 150% | 93% | |

(1)The product distorted.
(2)The product distorted badly.
(3)The control samples easily distorted on heating and distorted on shrinkage. Recovery was not uniform.
(4)Unirradiated Cpd. No. 6 samples could not be stretched.

From these tests, it may be concluded that the blends of this invention are heat recoverable and that substantially no amnesia appears after short term storage. Radiation dosages as low as 2.5 Mrads are sufficient to impart recovery properties without distortion. Since compound No. 6 showed distortion in these tests when heated, the use of a polyfunctional acrylate is not that beneficial in recovery.

EXAMPLE 6

The compositions of Example 1 were cut into ½" by 6" strips having a thickness of 75 mils after having been irradiated to various doses. In order to determine the heat aging properties of these blends, these strips were placed upon aluminum plates in an air circulating oven and conditioned at 150° C. for the indicated period of time. The strips were removed at the indicated time, cooled to 23° C., and tested for flexibility. No flexibility was evidence of degradation and loss of elongation. This constituted failure. A strip was considered to be flexible if it could be bent back upon itself without cracking. If a strip cracked, it was a failure; if still flexible, it passed this aging test.

The results of heat aging the CDB blends with polyethylene were:

TABLE VI

HEAT AGING CDB/POLYETHYLENE BLENDS TIME AT 150° C.

| COMPOUND | DOSE (Mrad) | 1 HOUR | 28 HRS. | 96 HRS. | 192 HRS. | 600 HRS. |
|---|---|---|---|---|---|---|
| 1 | NONE | OK | OK | OK | FAIL | |
| | 2.5 | OK | OK | OK | FAIL | |
| | 5.0 | OK | OK | OK | FAIL | |
| | 7.5 | OK | OK | OK | FAIL | |
| | 10.0 | OK | OK | OK | FAIL | |
| | 15.0 | OK | OK | OK | FAIL | |
| | 20.0 | OK | OK | OK | FAIL | |
| 2 | NONE - Fell Apart | | | | | |
| | 2.5 | OK | OK | OK | FAIL(1) | |
| | 5.0 | OK | OK | OK | FAIL | |
| | 7.5 | OK | OK | OK | FAIL | |
| | 10.0 | OK | OK | OK | FAIL | |
| | 15.0 | OK | OK | OK | FAIL | |
| | 20.0 | OK | OK | OK | FAIL | |
| 3 | NONE | OK | OK | OK | (2) | |
| | 2.5 | OK | OK | OK | FAIL | |
| | 5.0 | OK | OK | OK | FAIL | |
| | 7.5 | OK | OK | OK | OK | |
| | 10.0 | OK | OK | OK | FAIL | |
| | 15.0 | OK | OK | OK | FAIL | |
| | 20.0 | OK | OK | OK | FAIL | |
| 4 | NONE | FAIL | FAIL | FAIL | FAIL | |
| | 2.5 | OK | OK | OK | OK | FAIL |
| | 5.0 | OK | OK | OK | OK | FAIL |
| | 7.5 | OK | OK | OK | OK | FAIL |
| | 10.0 | OK | OK | OK | (3) | FAIL |
| | 15.0 | OK | OK | OK | FAIL | |
| | 20.0 | OK | OK | OK | FAIL | |
| 5 | NONE - Fell Apart | | | | | |
| | 2.5 | OK | OK | OK | OK | (3) |
| | 5.0 | OK | OK | OK | OK | (3) |
| | 7.5 | OK | OK | OK | OK | FAIL |
| | 10.0 | OK | OK | OK | OK | FAIL |
| | 15.0 | OK | OK | OK | OK | FAIL |
| | 20.0 | OK | OK | OK | (3) | FAIL |
| 6 | NONE - Fell Apart | | | | | |
| | 2.5 | OK | OK | OK | OK(4) | (3) |
| | 5.0 | OK | OK | OK | OK(4) | (3) |
| | 7.5 | OK | OK | OK | OK(4) | FAIL |
| | 10.0 | OK | OK | OK | OK | FAIL |
| | 15.0 | OK | OK | OK | OK | FAIL |
| | 20.0 | OK | OK | OK | OK(5) | FAIL |

(1)While all failed at 192 hrs., the failure increased in magnitude as the radiation dose increased.
(2)Stuck to metal and could not be tested.
(3)Borderline. In No. 5 at 192 Hrs., the sample was also tacky and at 600 hrs., there was heavy surface oxidation. In No. 6 at 600 hrs., there was also heavy surface oxidation.
(4)Distortion but passed test.
(5)Tacky.

As can be seen, the compounds which have been exposed at higher irradiation doses have a lower resistance to heat aging. As would be expected, an antioxidant is beneficial in maintaining properties on aging. The use of a polyfunctional acrylate is also beneficial, but the use of an antioxidant is preferred even at the 1% level since the acrylate is hard to work with and has other detrimental effects as reported above, even though it may give better aging characteristics. Phase separation was in evidence in No. 5, the compound with conventional butyl. Because of its tackiness Compound No. 5 appeared more flexible than would be anticipated. Of the CDB compounds without stabilizers, Compounds Nos. 1, 2 and 3, Compound No. 2, the 50/50 blend, appeared to age better.

EXAMPLE 7

Using a small "OO" Banbury mixer without steam, several batches were formulated of the following ingredients:

|  | % wt. | grams |
|---|---|---|
| HDPE | 48 | 1200 |
| CD Butyl | 48 | 1200 |
| Irganox 1010 | 1 | 25 |
| FEF Carbon Black | 3 | 75 |

In each bath the CDB and HDPE were first blended and then the antioxidant and carbon black were added. The mixing cycle was 10 minutes. The material was cut into chunks, cooled and granulated. Heat up during granulation was minimized.

The same general procedure as above was used to form two batches of the following compound by wt.: 49.5% CDB; 49.5% HDPE: and 1.0% Irganox 1010. The batches were intermixed and the combined batch was found to form a very friable mass.

The carbon black containing compound was extruded in a 2 inch extruder with a sheet die of approximately 26 inches in width using a 3 roll stack and conventional wind-up equipment. The compound extruded quite well and formed a sheet of about 0.025–0.030 in. in thickness. Die temperatures of 375° F. and barrel temperatures of 380° F. were used.

The back pressure was 3900 psi and line speed was approximately 15 feet/min. Die swell was surprisingly low for a compound containing about 50% elastomer. The compounds of this invention as illustrated in this example are thus extrudable and may be formed into sheets or films.

EXAMPLE 8

The sheet formed from the black compound in Example 7 was irradiated to 2.5 Mrads using a 3 MeV Dynamitron Electron Beam Accelerator.

A. HEAT SEALABILITY

Using a standard commerical type of bag heat sealer which has a heated element protected by a glass/PTFE tape, heat seals were made using a portion of the irradiated sheet. Sufficient time and heat was used to form a seal that was good enough to survive being peeled to failure with either partial or total tear of the base material. The irradiated sheet based on a CDB-polyethylene blend is therefore heat sealable.

B. EXTENSIBILITY/RECOVERY

Strips of the irradiated sheet ½" wide by 10" long were placed in a 150° C. air circulating oven to melt out the crystalline segments. Such strips were then removed quickly and stretched in air by hand to various degrees of extension without breaking. For example, a bench mark of 2" length before extension was 13½" after expansion for a percentage expansion of:

$$[(13.5/2.0) \times 100] - 100\% = 575\%$$

This is an unusually high expansion ratio for a cross-linked material.

The expanded strip was then reheated at 150° C. and allowed to freely recover to its original (as cross-linked) dimensions. The bench marks were 2⅛" apart after recovery indicating almost complete recovery. This is an unusually good recovery of original dimensions, especially for materials irradiated to only 2½ Mrads, particularly after such a large expansion deformation and in light of the unusually high hot modulus of this material.

These two steps demonstrate the presence of a strong cross-linked network. Since the crystalline melting point of the high density polyethylene component is 132° C. the high expansion and good recovery of these compounds relies on the irradiation cross-linking of the CDB not just the cross-linking of the polyethylene.

C. EXPANSION OF HEAT SEALED TUBE

A piece of the irradiated sheet was formed into a tube, and a "good seal" made with the heat sealer, as per A above. This tube was then sliced into ½" and into 1" wide ringlets, inclusive of the overlap sealed bond.

These loop rings had a layflat of approximately 5½ inches, hence a diameter of approximately 3½ inches. Loops were placed in the 150° C. oven until hot, then withdrawn and stretched by hand into larger diameter loops. The seals did not fail during expansion. One such loop had a layflat of 20", indicating a rough expansion ratio of:

$$[(12.7/3.5) \times 100] - 100\% = 263\%$$

Another such bonded and expanded loop was placed over two side-by-side cardboard cores, having a total circumference about twice that of the original loop before expansion. The bond was placed so that is was not constrained. The cores and loop were placed in the 150° C. oven, allowed to reach full temperature, then removed and allowed to cool. The seal did not fail during recovery at 150° C. or during cooling. The cores were tightly held together by the cooled loop. This placed maximum stress on the heat sealed bondline. This is a remarkable feature of these compositions since these heat sealed bonds were formed with sheet which had been previously irradiated.

EXAMPLE 9

Unirradiated 5 mil thick films from Example 1 were tested for moisture permeability (Honeywell MVTR) according to ASTM E-398-70. The test was conducted at 100° F. with a 1% RH differential. The results below are reported in grams of water permeation per 100 square inches of sample per 24 hours.

| Compound | MVTR |
|---|---|
| 1 | 0.0875 |
| 2 | 0.0529 |
| 3 | 0.0389 |
| 4 | 0.0450 |
| 5 | 0.0450 |
| 6 | 0.0630 |

These results show the outstanding moisture vapor resistance for the compounds of this invention which can be used as indicated for the heat recoverable wrappings, barrier films or water-proofing membranes.

EXAMPLE 10

The unique features of these polyethylene blends with conjugated diene butyl can be used in the fabrication of articles which must meet demanding environmental requirements and exhibit outstanding resistance to moisture permeability, but which could also benefit from ease of fabrication. For example, a relatively low cost solar heating panel with an internal manifold configuration was fabricated from two 40 mil thick sheets of a black high density polyethylene blend with conjugated diene butyl. This was the compound noted above in Example 7.

The two unirradiated sheets were ultrasonically welded along the perimeter of the panel with the exception of entrance and exit ports at diagonal ends of the panel. A Branson model 8400 ultrasonic welder with a ⅛ inch by 10 inch horn was used to weld the two sheets. Using a flat bottom platen, 35 psig clamping pressure, 3 second weld time and 1 second hold, excellent bonds were formed between the two sheets. To form the manifold, bonds 10 inches long were made at ½ inch intervals. These were inside the bonded perimeter which was 11 inches wide by 20 inches long. After bonding, the panel was irradiated to 10 Mrads to enhance the bond strength of the seal and to impart enhanced physical properties to the product.

Once given the above disclosure, many other features, modifications, and improvements will become apparent to the skilled artisan. Such other features, modifications and improvements are, therefore, considered a part of this invention, the scope of which is to be determined by the following claims.

I claim:

1. A composition comprising a cross-linkable polyethylene and a copolymer of isobutylene and a conjugated diene.

2. A composition according to claim 1 which includes a sufficient amount of said isobutylene copolymer to render a product formed of the composition heat sealable or sealable onto itself or other polyolefin compositions.

3. A composition according to claims 1 or 2 wherein said conjugated diene is a $C_5$ diene.

4. A composition according to claim 3 wherein said copolymer is a member selected from the group consisting of:

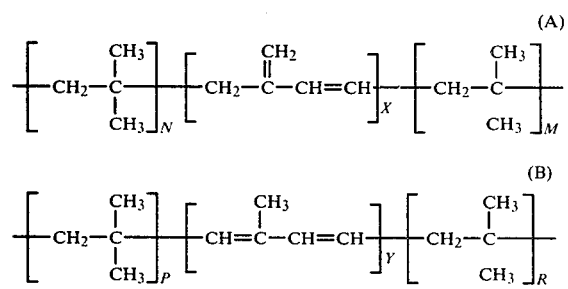

and mixtures thereof; wherein N, M, P and R are of a sufficient finite number and total so that the conjugated diene moieties X and Y, amounts to less than about 5 mole % of the copolymer.

5. A composition according to claim 4 wherein the conjugated diene amounts to about 1-2 mole % of the copolymer.

6. A composition according to claim 2 wherein said polyethylene has a density of about 0.95 and 0.96.

7. A composition according to claim 2 wherein said polyethylene is itself a copolymer or is a lower density homopolymer having a density of about 0.91 to 0.94.

8. A composition according to claim 5 wherein said copolymer is the product of the synthesis of isobutylene and isoprene subsequently halogenated and then dehydrohalogenated.

9. A composition according to claims 1 or 2 comprising about 30-70% by weight polyethylene and about 30-70% by weight copolymer.

10. A composition according to claim 9 comprising equal parts by weight of polyethylene and copolymer.

11. A composition according to claim 9 wherein the copolymer is a member selected from the group consisting of:

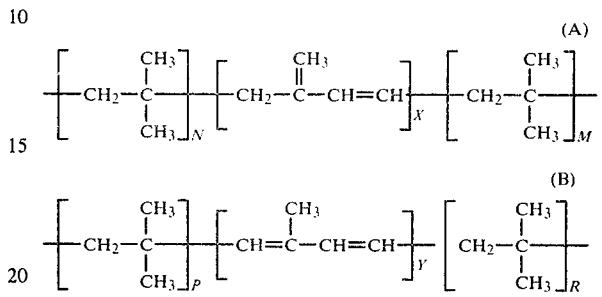

and mixtures thereof; wherein N, M, P and R are of a sufficient finite member and total so that the conjugated diene moieties X and Y amounts to less than 5 mole % of the copolymer.

12. A composition according to claim 11 wherein the conjugated diene amounts to about 1-2 mole % of the copolymer.

13. A composition according to claim 11 wherein said polyethylene has a density of about 0.95-0.96 and the composition is comprised of equal parts by weight of polyethylene and copolymer.

14. A composition according to claim 13 consisting essentially of about 50 wt. % polyethylene and 50 wt. % copolymer.

15. A composition according to claims 1 or 2 which further includes a member selected from the group consisting of a filler, pigment, antioxidant, plasticizer, flame retardant, blowing agent and mixtures thereof.

16. A composition according to claim 15 wherein said member does not exceed about 50% by weight of the total composition.

17. A composition according to claim 16 wherein said member is an antioxidant in an affective amount.

18. A composition according to claim 16 wherein said antioxidant is in an amount of about 1% by weight of said composition and consists essentially of Kis[methylene 3-(3',5',- di-tert-butyl-4'-hydroxy phenyl)propionate]methane.

19. A composition according to claim 18 wherein said copolymer is a member selected from the group consisting of:

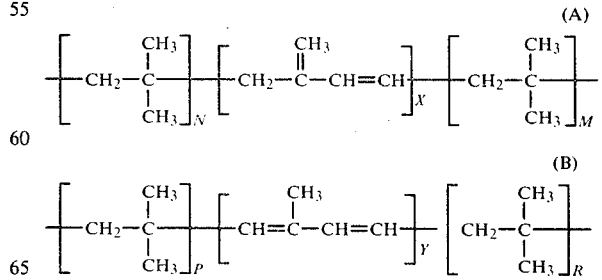

and mixtures thereof; wherein N, M, P and R are of sufficient finite number and total so that conjugated diene moieties X and Y amounts to less than about 1–2 mole % of the copolymer.

20. A composition according to claims 1 or 2 wherein said composition is capable of being formed into a cross-linked, heat sealable material which exhibits at least substantially the same strength characteristics as the material prior to cross-linking.

21. A composition according to claim 20 wherein said strength characteristics are exhibited both above and below the crystalline softening point of the material.

22. A composition according to claim 21 wherein the material has a relatively low vapor permeability.

23. A sheet or film formed of the composition of claim 2.

24. Articles formed of the composition of claim 2.

* * * * *